United States Patent
Lacasta I Sulla

(10) Patent No.: US 11,899,561 B2
(45) Date of Patent: Feb. 13, 2024

(54) METHOD FOR OPERATING A CONTROL UNIT WHEN TESTING SOFTWARE OF THE CONTROL UNIT, AND METHOD FOR OPERATING A TEST COMPUTER WHEN TESTING SOFTWARE OF A CONTROL UNIT

(71) Applicant: Robert Bosch GmbH, Stuttgart (DE)

(72) Inventor: Antoni Lacasta I Sulla, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 10 days.

(21) Appl. No.: 17/510,259

(22) Filed: Oct. 25, 2021

(65) Prior Publication Data

US 2022/0138083 A1    May 5, 2022

(30) Foreign Application Priority Data

Nov. 3, 2020    (DE) .................. 10 2020 213 809.5

(51) Int. Cl.
   *G06F 9/44* (2018.01)
   *G06F 11/36* (2006.01)

(52) U.S. Cl.
   CPC .................. *G06F 11/3636* (2013.01)

(58) Field of Classification Search
   CPC .................................................. G06F 11/3636
   See application file for complete search history.

(56) References Cited

U.S. PATENT DOCUMENTS

| | | | | |
|---|---|---|---|---|
| 5,936,974 A | * | 8/1999 | Roberts | G11C 29/46 714/718 |
| 7,594,142 B1 | * | 9/2009 | O'Leary | G06F 21/577 714/38.11 |
| 2008/0141266 A1 | * | 6/2008 | Hunt | G06F 12/109 711/E12.091 |
| 2009/0210702 A1 | * | 8/2009 | Welingkar | G06F 8/60 713/168 |
| 2011/0022700 A1 | * | 1/2011 | Ramanath | G06F 3/0481 709/224 |
| 2014/0215620 A1 | * | 7/2014 | Hayrynen | H04L 63/1416 726/23 |
| 2017/0195458 A1 | * | 7/2017 | Parekh | G06F 9/547 |

* cited by examiner

*Primary Examiner* — Hang Pan
(74) *Attorney, Agent, or Firm* — NORTON ROSE FULBRIGHT US LLP; Gerard A. Messina

(57) ABSTRACT

A method for operating a control unit when testing software of the control unit. The control unit includes a processor for executing the software and a memory for storing the software. The method includes: receiving test requests, generated by a test computer, in the control unit; executing a test program for testing the software based on the test requests, by executing a first binary file, which is stored in the memory, by the processor, the first binary file encoding a test version of the software which includes at least one test module necessary for executing the test program; sending test results from the control unit to the test computer; and receiving a second binary file, executable by the processor, in the control unit and storing the second binary file in the memory when the test computer has determined, based on the test results, that the software is fit for operation.

14 Claims, 3 Drawing Sheets

METHOD FOR OPERATING A CONTROL UNIT WHEN TESTING SOFTWARE OF THE CONTROL UNIT, AND METHOD FOR OPERATING A TEST COMPUTER WHEN TESTING SOFTWARE OF A CONTROL UNIT

FIELD

The present invention relates to a computer-implemented method for operating a control unit when testing software of the control unit, and to a computer-implemented method for operating a test computer when testing software of a control unit. The present invention furthermore relates to a control unit, to a test computer, to a test system, to a computer program, and to a computer-readable medium for carrying out the corresponding method or the corresponding methods. The control unit may be configured, for example, to control functions in a motor vehicle.

BACKGROUND INFORMATION

To ensure an operation of a control unit, for example of a control unit for controlling components of a motor vehicle, which is as malfunction-free as possible, software to be executed on the control unit, which may encompass an operating system and various applications, for example, may be subjected to various software tests. For example, it may be checked during such software tests whether individual components of the software were correctly implemented, whether components of the software which are dependent on one another collaborate correctly, or whether the software meets the requirements which are placed on it. For this purpose, the software may, for example, be transferred into a test mode in which test data for detecting certain software errors may be injected into the software by a tester. For safety reasons, however, such an injection of data should be prevented, if possible, during normal operation of the control unit.

SUMMARY

The present invention provides a method for operating a control unit, a method for operating a test computer, a control unit, a test computer, a system, a computer program, and a computer-readable memory medium. Advantageous refinements and improvements of the approach presented here are derived from the description and the figures.

Specific embodiments of the present invention advantageously make it possible for software of a control unit to be tested with the aid of one or multiple software module(s) of the software, and for this software module or these software modules to be permanently deactivated after testing, without having to change and re-compile a source code underlying the software.

A first aspect of the present invention relates to a computer-implemented method for operating a control unit when testing software of the control unit. The control unit includes a processor for executing the software and a memory for storing the software. In accordance with an example embodiment of the present invention, the method includes at least the following steps, which may preferably be carried out in the indicated order: receiving test requests generated by a test computer in the control unit; executing a test program for testing the software based on the test requests by executing a first binary file, which is stored in the memory, by the processor, the first binary file encoding a test version of the software which includes at least one test module necessary for executing the test program, test results being generated; sending the test results from the control unit to the test computer; receiving a second binary file, which is executable by the processor, in the control unit and storing the second binary file in the memory when the test computer has determined, based on the test results, that the software is fit for operation, the second binary file having been generated from the first binary file by the test computer and encoding a final version of the software which prevents the at least one test module from being executed.

A second aspect of the present invention relates to a computer-implemented method for operating a test computer when testing software of a control unit. The control unit includes a processor for executing the software and a memory for storing the software. In accordance with an example embodiment of the present invention, the method includes at least the following steps, which may preferably be carried out in the indicated order: generating test requests by the test computer; sending the test requests from the test computer to the control unit, the test requests prompting the processor to execute a test program for testing the software by executing a first binary file stored in the memory, the first binary file encoding a test version of the software which includes at least one test module necessary for executing the test program, test results being generated; receiving the test results generated by the control unit in the test computer; determining, by the test computer, based on the test results whether the software is fit for operation; generating a second binary file from the first binary file by the test computer when it was determined that the software is fit for operation, the second binary file encoding a final version of the software which prevents the at least one test module from being executed; and sending the second binary file from the test computer to the control unit.

This has the technical effect that a renewed execution of the test program may be prevented, without having to change a source code of the software to do so. In other words, it may thus be avoided that the source code has to be compiled again after the software has been successfully tested. Since the (compiled) version of the software is tested which is later actually executed during normal operation of the control unit, the likelihood of malfunctions of the control unit during normal operation may be considerably reduced.

The example method for operating the control unit may, for example, be carried out automatically by the control unit. The method for operating the test computer may also, for example, be carried out automatically by the test computer.

The control unit or the test computer may encompass hardware modules and/or software modules.

The example control unit may, for example, be a control unit of a motor vehicle, such as a passenger car, a truck, a bus or a motorcycle.

In addition to the processor and the memory, the control unit may include means for data communication with the test computer or other peripheral devices.

The memory of the control unit may, for example, be a non-volatile memory element, such as a ROM, an EPROM or a flash memory, and/or a volatile memory element, such as a RAM. The software of the control unit to be tested may be stored in the non-volatile memory element.

It is possible for the control unit to include a microcontroller, it being possible for the processor, the memory and/or the communication interface to be components of the microcontroller.

For example, the control unit, for example its microcontroller, may include a Joint Test Action Group (JTAG) interface for the data communication with the test computer.

Such a JTAG interface allows integrated circuits to be tested and debugged. For example, the JTAG interface allows accessing an internal memory of the microcontroller, stopping processor cores, setting break points and the like. The data communication between the control unit and the test computer may, for example, take place via a debugger including a JTAG interface for the data communication with the JTAG interface of the control unit and a further interface for the data communication with the test computer, such as USB, Ethernet or UART. Suitable debugger software for testing the software of the control unit may run on the test computer. The second binary file may, for example, be transferred via the debugger or a programming device to the control unit.

As an alternative or in addition to the JTAG interface, the control unit may include a diagnostic interface for the data communication with an external diagnostic device, such as via CAN bus, FlexRay and/or Ethernet. Such a diagnostic interface makes it possible, for example, to read out an error memory of the control unit, carry out software updates, or change configuration parameters of the control unit. Similarly to the JTAG interface, the diagnostic interface may act as a communication interface for the data communication with the test computer.

A test computer may, in general, be understood to mean an external computer which may be temporarily connected to the control unit for test purposes, such as a PC, a laptop or a tablet, and on which suitable test software may be executed, for example for generating the test requests, evaluating the test results and generating and sending the second binary file, also referred to as debugger software above. The test computer, however, may also be a specifically programmed test device for the automated testing of the software of the control unit.

The first binary file may, for example, have been generated by compiling and linking on a computer, such as the test computer, and be stored in the HEX format, for example. The first binary file may implement, on the one hand, functions which are to be executed by the control unit during normal operation and, on the other hand, a test function which allows these functions to be tested. The test function may be implemented in the form of one or multiple test module(s) of the software.

For example, the first binary file may be programmed into the control unit under laboratory conditions and/or in a test environment in order to test the software of the control unit. During the generation of the second binary file from the first binary file by the test computer, the test module or the test modules may be replaced with specific contents which forcibly cause the operation to be aborted during the execution of these contents, while the remaining functions of the software are preserved. The second binary file may then be used to manufacture the control unit.

For example, the test computer may be configured to generate test requests for carrying out various types of tests using the software of the control unit, in particular, for example, an integration test.

The software of the control unit to be tested may, for example, encompass an operating system and/or various application programs. For example, the software may be firmware of the control unit.

A test module may, in general, be understood to mean a software module which is integrated into the software of the control unit and which is required to execute the test program. The overwriting of the test module in the first binary file thus causes the test program to no longer be executable. In particular, the test module may be exclusively configured for the execution of the test program. In this way, it may be achieved that the functionality of the software relevant for the fitness for operation is not, or at least not significantly, impaired when the test module is overwritten.

The test module may, for example, act as an interface between surroundings of the control unit and internal interfaces of components of the software of the control unit. For example, the test module may be configured to switch the software between a normal mode and a test mode, an injection of (test) data into the component of the software to be tested being enabled in the test mode, and such an injection being prevented in the normal mode. In other words, the test module may act as a data switch for controlling a data flow between the communication interface of the control unit and various layers of the software of the control unit. Such a data switch may also be referred to as a switch for data and control, abbreviated as SDC. The software of the control unit may also include multiple such data switches as test modules. In the process, each of the data switches may be deleted from the memory of the control unit during the execution of the delete command.

To be able to test the software of the control unit under realistic conditions, the control unit may, for example, be integrated into a suitable test environment. Such a test environment makes it possible, for example, to provide different combinations of input signals and messages for the control unit and to record corresponding output data of the control unit. The test environment may, for example, be configured to emulate the behavior of vehicle components which are connected to the control unit during normal operation.

To determine whether the software is fit for operation, i.e., fit for normal operation under real conditions, the test results may, for example, be compared to corresponding setpoint test results which, for example, may be stored in a lookup table. Depending on the result of the comparison, it may be determined whether a test result represents an error which impairs the fitness of the software for operation, or not.

A third aspect of the present invention relates to a control unit which includes a processor for executing software and a memory in which the software is stored. In accordance with an example embodiment of the present invention, the control unit is configured to carry out the method according to one specific embodiment of the first aspect of the present invention. Features of the method according to one specific embodiment of the first aspect of the present invention may also be features of the control unit, and vice versa.

A fourth aspect of the present invention relates to a test computer which is configured to carry out the method according to one specific embodiment of the second aspect of the present invention. Features of the method according to one specific embodiment of the second aspect of the present invention may also be features of the test computer, and vice versa.

A fifth aspect of the present invention relates to a test system for testing software of a control unit. The test system includes a control unit according to one specific embodiment of the third aspect of the present invention and a test computer according to one specific embodiment of the fourth aspect of the present invention.

A sixth aspect of the present invention relates to a computer program. The computer program encompasses commands which prompt a control unit according to one specific embodiment of the third aspect of the present invention to carry out the method according to one specific embodiment of the first aspect of the present invention, during the execution of the computer program by the control unit, and/or commands which prompt a test computer according to one specific embodiment of the fourth aspect of the present invention to carry out the method according to one specific embodiment of the second aspect of the present invention, during the execution of the computer program by the test computer.

A seventh aspect of the present invention relates to a computer-readable medium on which the computer program according to one specific embodiment of the sixth aspect of the present invention is stored. The computer-readable medium may be a volatile or non-volatile data memory. For example, the computer-readable medium may be a hard drive, a USB memory device, a RAM, a ROM, an EPROM or a flash memory. The computer-readable memory may also be a data communication network enabling a download of program code, such as for example the Internet or a data cloud.

Features of the method according to one specific embodiment of the first and second aspects of the present invention may also be features of the computer program and/or of the computer-readable medium, and vice versa.

Features regarding specific embodiments of the present invention may, among other things, be considered to be based on the concepts and findings described hereafter.

According to one specific embodiment of the present invention, test data for simulating error situations in components of the software to be tested are input during the execution of the test program. With the aid of the test data, for example, the following error situations may be simulated: infinite loops, zero values, memory access violations, disruptions of program sequences, execution of impermissible commands or invalid floating-point operations. However, arbitrary other error situations or test cases are also possible. The test data may, for example, be injected into the control unit by the test computer. The injection of the test data may take place with the aid of the test module or the test modules of the software. For example, each of the components to be tested may generate a test result in response to the input of the test data. As an alternative or in addition, it is possible that the test data are provided by the control unit itself. This specific embodiment simplifies, among other things, the execution of an integration test in which the correct interplay of various components of the software which are dependent on one another is tested.

According to one specific embodiment of the present invention, external data generated by the test computer are received in the control unit and used as the test data. As previously mentioned, the test data may be read in via the communication interface of the control unit. As a result of this specific embodiment, the generation of test data by the control unit may be dispensed with.

According to one specific embodiment of the present invention, the test data are input into a system layer of the software. The system layer may, for example, encompass an operating system of the control unit. The system layer may, among other things, provide memory services and/or communication services for application programs running on the control unit, for example. The test module of the software may, for example, be integrated into the system layer, for example into an upper area of the system layer which is close to the application layer. As a result of this specific embodiment, software errors in the system layer may be detected.

According to one specific embodiment of the present invention, it is prevented that, in addition to the test data, output data of at least one component of the software which is situated outside the system layer are input into the system layer. The component situated outside the system layer may, for example, be a component of an application layer or of an intermediate layer between the system layer and the application layer (see below). As a result of this specific embodiment, the test results may avoid potentially distorting interactions between the test data and the output data of the component(s) situated outside the system layer.

According to one specific embodiment of the present invention, the test data are input into an application layer of the software. The application layer may include various application programs of the control unit, such as for example a program for controlling a windshield wiper, a program for controlling a central locking system and the like. As a result of this specific embodiment, software errors in the application layer may be detected.

In addition to the system layer and the application layer, the software of the control unit may encompass an intermediate layer for mediating between the system layer and the application layer, also referred to as middleware. Such an intermediate layer enables, among other things, the separate development of the system and application layers, and the testing of individual software components. The test module may, for example, be configured to interact between the system layer and the intermediate layer.

According to one specific embodiment of the present invention, it is prevented that, in addition to the test data, output data of at least one component of the software which is situated outside the application layer are input into the application layer. The component situated outside the application layer may, for example, be a component of the system layer or of the intermediate layer. As a result of this specific embodiment, the test results may avoid potentially distorting interactions between the test data and the output data of the component(s) situated outside the application layer.

According to one specific embodiment of the present invention, the test module is configured to selectively connect an input of at least one component of the software to be tested to a communication interface for the data communication with the test computer or to an output of at least one further component of the software. In this way, the software may be switched with little complexity between a normal mode, in which the component to be tested is connected to the output of the further component(s) instead of to the communication interface, and a test mode, in which the component to be tested is connected to the communication interface instead of to the output of the further component(s). In other words, as a result of this specific embodiment, test data may be deliberately input into individual components of the software, it being possible to avoid undesirable interactions with further components of the software.

According to one specific embodiment of the present invention, the test program is executed on a first control unit, and the second binary file is stored in a memory of a second control unit. In other words, a different control unit may be used for testing the software than for storing the second binary file. For example, the software may be tested on a test control unit under laboratory conditions and/or in a test environment, while the second binary file may then be programmed into a control unit to be manufactured within the scope of a manufacturing process.

BRIEF DESCRIPTION OF THE DRAWINGS

Specific embodiments of the present invention are described hereafter with reference to the figures; neither the figures nor the description should be interpreted as limiting the present invention.

The figures are only schematic representations and are not true to scale. Identical reference numerals denote identical or equally acting features in the figures.

DETAILED DESCRIPTION OF EXAMPLE EMBODIMENTS

Figure 1:
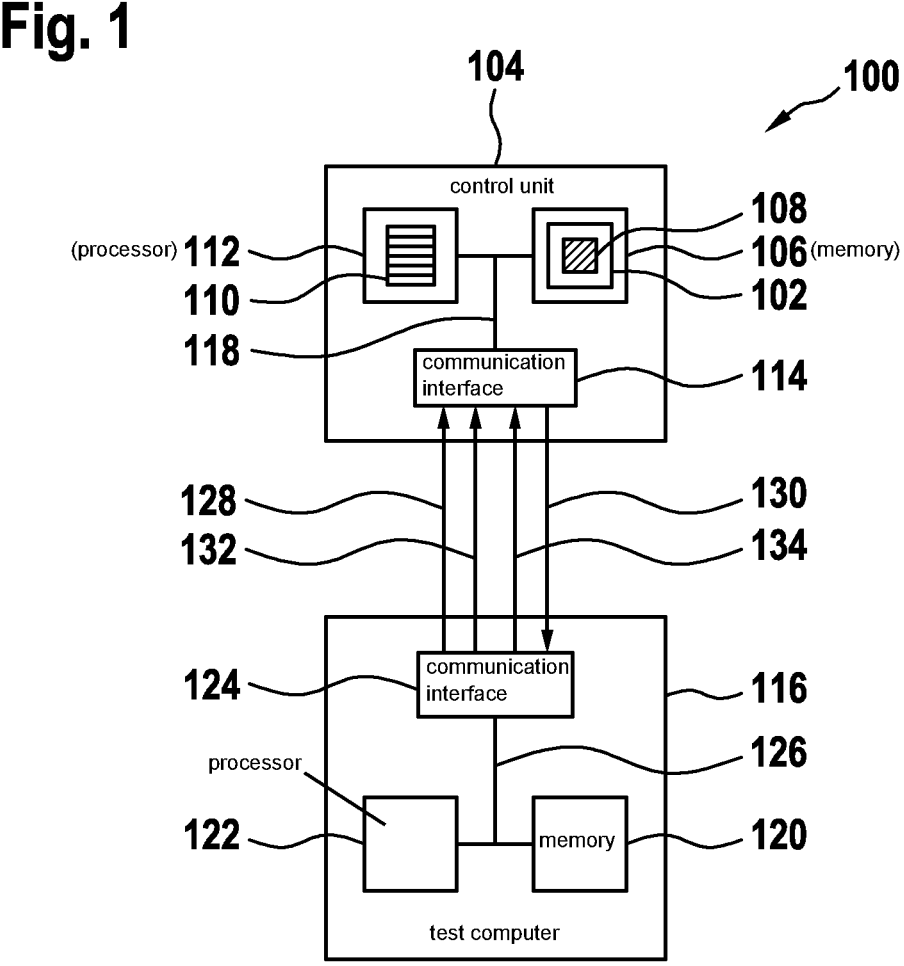
FIG. 1 schematically shows a test system according to one exemplary embodiment of the present invention.

FIG. 1 shows a test system 100 for testing software 102 of a control unit 104. Software 102 is stored in a memory 106 of the control unit 104, such as a flash memory or an EPROM.

Software 102 encompasses at least one test module 108 for executing a test program 110, which is configured to detect errors in software 102. Software 102 is stored in the form of a first binary file in memory 106.

Control unit 104 furthermore includes a processor 112 for executing software 102 or test program 110 with the aid of test module 108 integrated into software 102, as well as a communication interface 114 for the data communication with a test computer 116 of test system 100. Processor 112, memory 106, and communication interface 114 may be connected to one another via a bus system 118. Processor 112 and/or memory 106 may, for example, be components of a microcontroller.

Test computer 116 may be equipped with a test computer memory 120, a test computer processor 122, a test computer communication interface 124 for the data communication with control unit 104, and a test computer bus system 126.

Figure 5:
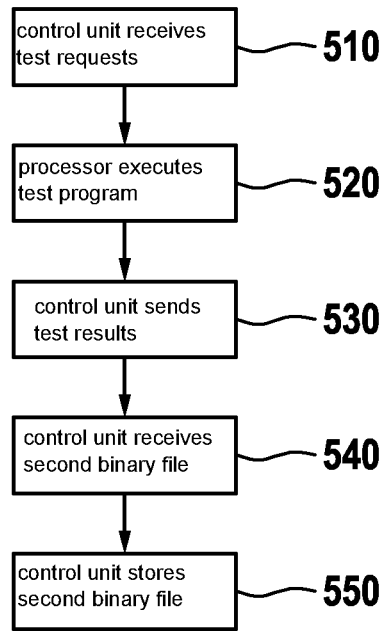
FIG. 5 shows a flowchart to illustrate a method for operating a control unit according to one exemplary embodiment of the present invention.
Figure 6:
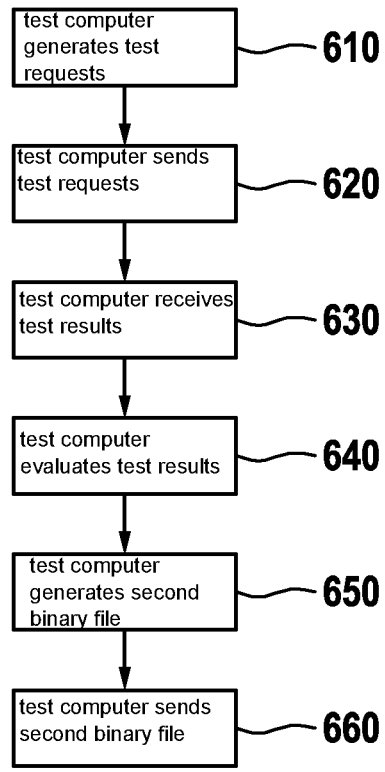
FIG. 6 shows a flowchart to illustrate a method for operating a test computer according to one exemplary embodiment of the present invention.

A method for testing software 102 with the aid of test system 100 may include the following steps, which are carried out, on the one hand, by control unit 104, as is illustrated in FIG. 5, and, on the other hand, by test computer 116, as is illustrated in FIG. 6.

In step 610, test computer 116 generates test requests 128.

In step 620, test computer 116 sends test requests 128 via test computer communication interface 124 to communication interface 114.

In step 510, control unit 104 receives test requests 128 at communication interface 114.

In step 520, processor 112 executes test program 110 based on test requests 128. For this purpose, processor 112 executes a test version of software 102 which is encoded by the first binary file and includes test module 108. Within the scope of test program 110, multiple tests may be carried out, for example, a test result 130 being generated in each of the tests.

In step 530, control unit 104 sends test results 130, for example collectively or individually, via communication interface 114 to test computer communication interface 124.

In step 630, test computer 116 receives test results 130 at test computer communication interface 124.

In step 640, test computer 116 evaluates test results 130. For this purpose, for example, a corresponding evaluation program may be executed by test computer processor 122, in which test results 130 are compared to stored setpoint test results, and it is determined, depending on the deviation between test results 130 and the respective setpoint test results, whether software 102 is fit for operation or not.

In step 650, test computer 116 generates a second binary file 132 from the first binary file, which is stored in test computer memory 120 and, for example, may have been generated by compilation and linking by test computer 116, if in step 640 software 102 was classified as being fit for operation by the evaluation program. Second binary file 132 encodes a final version (fit for manufacture) of software 102, which prevents the execution of test module 108. For this purpose, test computer 116 may replace areas of the first binary file encoding test module 108 with suitable contents.

In step 660, test computer 116 sends second binary file 132 via test computer communication interface 124 to communication interface 114.

In step 540, control unit 104 receives second binary file 132 at communication interface 114, and stores it in step 550 in memory 106. In the process, for example, the first binary file may be overwritten with second binary file 132.

Thereafter, for example, further tests may be carried out using software 102. These may be tests which may be carried out without using test module 108 or test modules 108. For example, it may be checked during such a test under realistic conditions whether the software meets all software requirements.

It is possible that special test data 134 for simulating error situations in components of software 102 to be tested are input in step 520 during the execution of test program 110.

Test data 134 may, for example, be generated by test computer 116 and be sent via test computer communication interface 124 to communication interface 114, control unit 104 being able to receive test data 134 at communication interface 114.

Figure 2:
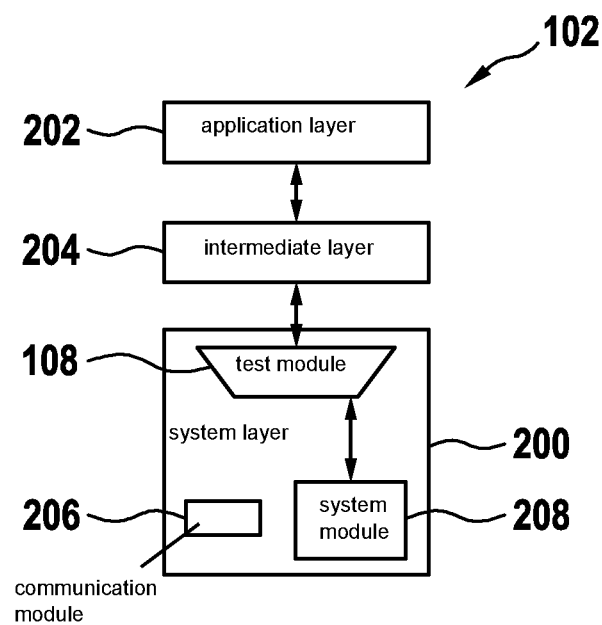
FIG. 2 schematically shows a data flow between components of software of a control unit of FIG. 1 in a normal mode.
Figure 3:
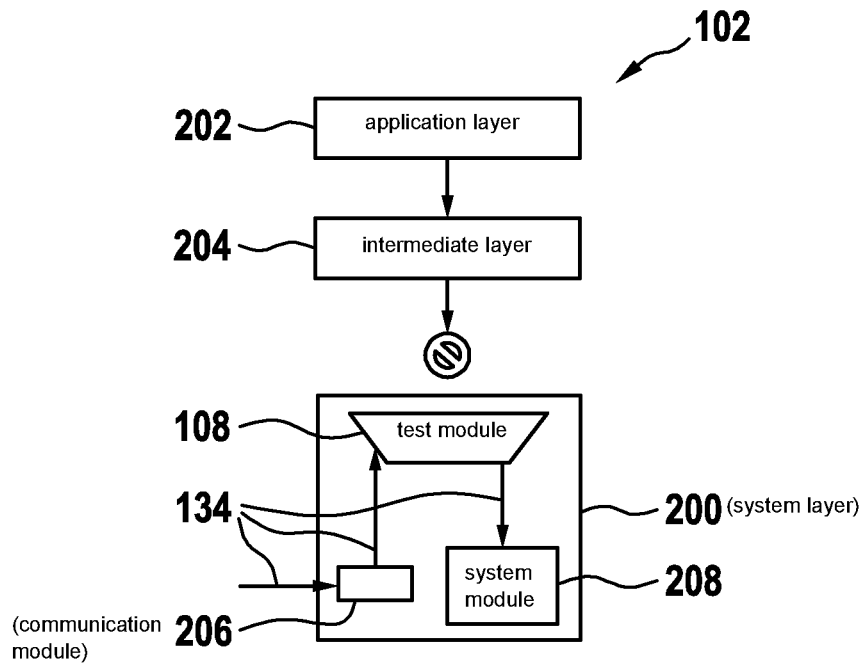
FIG. 3 schematically shows a data flow between components of software of a control unit of FIG. 1 in a first test mode.
Figure 4:
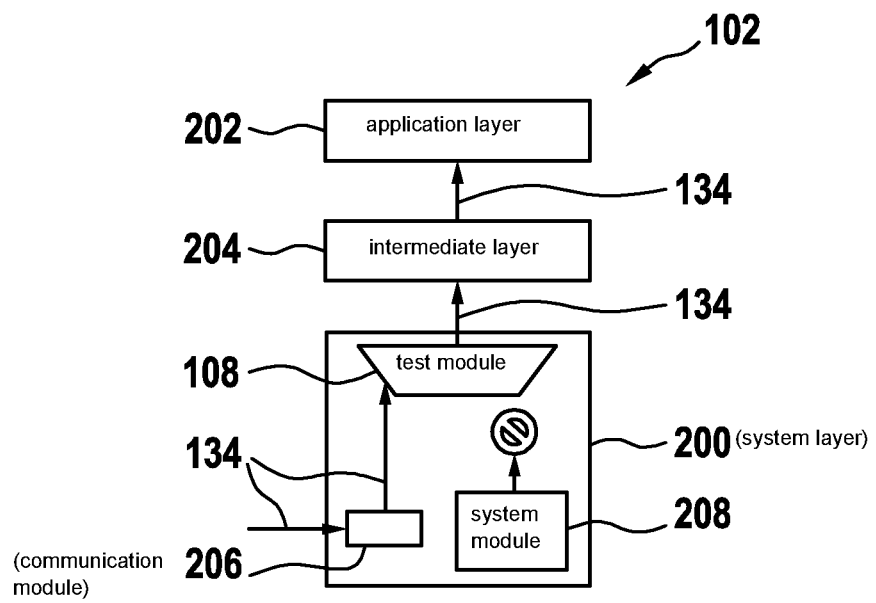
FIG. 4 schematically shows a data flow between components of software of a control unit of FIG. 1 in a second test mode.

It is described in greater detail hereafter based on FIGS. 2 through 4 how test data 134 may be injected into software 102.

FIG. 2 shows a possible architecture of software 102. In this example, software 102 encompasses a system layer 200 for executing base software, for example of an operating system, an application layer 202 for executing application software, and an intermediate layer 204, which enables the exchange of data between system layer 200 and application layer 202.

Test module 108 is integrated into system layer 200 here by way of example and configured as a data switch. In addition, system layer 200, in this example, includes a communication module 206 for the data communication with communication interface 114, and a system module 208 for providing system services, for example for the data communication with peripheral devices or for controlling access to non-volatile memory 106.

In the normal mode of software 102 shown in FIG. 2, data may be exchanged, on the one hand, between application layer 202 and intermediate layer 204 and, on the other hand, via test module 108 between intermediate layer 204 and system module 208. In the normal mode, test module 108 is configured in such a way that the exchange of data both between test module 108 and intermediate layer 204 and between test module 108 and system module 208 is made possible, and the exchange of data between test module 108 and communication module 206 is prevented.

FIG. 3 shows a data flow in a first test mode of software 102. In the first test mode, test module 108 is configured in such a way that the exchange of data both between test module 108 and communication module 206 and between test module 108 and system module 208 is made possible, and the exchange of data between test module 108 and intermediate layer 204 is prevented. In this way, it is prevented that, in addition to test data 134 which are received at communication module 206 and sent via test module 108 to system module 208, output data of intermediate layer 204 are processed in system module 208.

The first test mode makes it possible, for example, to carry out an integration test using components of system layer 200. In the process, for example, simulated output data of application layer 202 or other data suitable for detecting software errors in system layer 200 may be used as test data 134.

FIG. 4 shows a data flow in a second test mode of software 102. In the second test mode, test module 108 is configured in such a way that the exchange of data both between test module 108 and communication module 206 and between test module 108 and intermediate layer 204 is made possible, and the exchange of data between test module 108 and system module 208 is prevented. In this way, it is prevented that, in addition to test data 134 which are received at communication module 206, sent via test module 108 to intermediate layer 208 and sent via intermediate layer 204 to application layer 202, output data of system module 204 are processed in intermediate layer 204 or in application layer 202.

The second test mode makes it possible, for example, to carry out an integration test using components of application layer 202. In the process, for example, simulated output data of system layer 200 or other data suitable for detecting software errors in application layer 202 may be used as test data 134.

For switching test module 108 between the normal mode, the first test mode and the second test mode, test computer 116 may, for example, send appropriate switch commands to control unit 104. The switch commands may, for example, be encoded in test requests 128.

Finally, it is pointed out that terms such as "including," "encompassing" etc. do not exclude other elements or steps, and that terms such as "a" or "an" do not exclude a plurality. Reference numerals shall not be regarded as limiting.

What is claimed is:

1. A computer-implemented method for operating a control unit when testing software of the control unit of a test system, the control unit including a processor for executing the software and a memory for storing the software, the method comprising:
    receiving, in the control unit, test requests generated by a test computer;
    executing, by the processor of the control unit, a test program for testing the software, based on the test requests, by executing the software which is in the form of a first binary file, which is stored in the memory, the first binary file encoding a test version of the software which includes at least one test module necessary for executing the test program, test results being generated;
    sending the test results from the control unit to the test computer, having a test processor for evaluating the test results; and
    receiving, in the control unit, a second binary file from the test computer which is executable by the processor of the control unit, and storing the second binary file in the memory, when the test computer has determined, based on the test results, that the software is fit for operation, the second binary file having been generated from the first binary file by the test computer and encodes a final version of the software which prevents the at least one test module from being executed;
    wherein the test program is configured to detect errors in the software,
    wherein the test system includes a first communication interface for communicating data with a second communication interface of the test computer, wherein the data includes the test requests and the test results,
    wherein the test computer generates the second binary file from the first binary file,
    wherein the test computer evaluates the test results using an evaluation program, which is executed by the test processor, in which the test results are compared to stored setpoint test results, and it is determined, depending on a deviation between the test results and the setpoint test results, whether the software is fit for operation,
    wherein the control unit includes a switching test module for switching between a normal mode, a first test mode and a second test mode, wherein the test computer is configured to send switch commands to the control unit, and wherein the switch commands are encoded separately or in the test requests,
    wherein the software of the control unit includes an intermediate layer or middleware for mediating between a system layer and an application layer, wherein the intermediate layer enables separate development of the system layer and the application layer, and the testing of individual software components, and wherein the switching test module is configured to interact between the system layer and the intermediate layer,
    wherein the control unit includes a processor for executing the software or the test program with the switching test module integrated into the software, and the first communication interface for providing data communication with the test computer of the test system, wherein the processor, the memory, and the first communication interface are connectable to one another via a bus system,
    wherein the test computer includes a test computer memory, a test computer processor, a second communication interface for the data communication with control unit, and a test computer bus system, and
    wherein the test program is permanently deactivated after testing, without having to change and re-compile a source code underlying the software.

2. The method as recited in claim 1, wherein test data for simulating error situations in components of the software to be tested are input during the execution of the test program.

3. The method as recited in claim 2, wherein external data generated by the test computer are received in the control unit and used as the test data.

4. The method as recited in claim 2, wherein the test data are input into a system layer of the software.

5. The method as recited in claim 4, wherein exchange of data between the test module and the intermediate layer is prevented.

6. The method as recited in claim 2, wherein the test data are input into the application layer of the software.

7. The method as recited in claim 6, wherein exchange of data between the test module and the system layer is prevented.

8. The method as recited in claim 1, wherein the test module is configured to selectively connect an input of at least one component of the software to be tested to the communication interface for data communication with the test computer, or to an output of at least one further component of the software.

9. The method as recited in claim 1, wherein the test program is executed on a first control unit, and the second binary file is stored in a memory of a second control unit.

10. A control unit of a test system, comprising:
a processor for executing software; and
a memory in which the software is stored;
wherein the control unit is configured to perform a computer-implemented method to test software of the control unit, by performing the following:
receiving test requests generated by a test computer;
executing, by the processor, a test program for testing the software, based on the test requests, by executing the software which is in the form of a first binary file, which is stored in the memory, the first binary file encoding a test version of the software which includes at least one test module necessary for executing the test program, test results being generated;
sending the test results from the control unit to the test computer, having a test processor for evaluating the test results; and
receiving a second binary file, which is from the test computer, which is executable by the processor of the control unit, and store the second binary file in the memory when the test computer has determined, based on the test results, that the software is fit for operation, the second binary file having been generated from the first binary file by the test computer and encodes a final version of the software which prevents the at least one test module from being executed;
wherein the test program is configured to detect errors in the software,
wherein the test system includes a first communication interface for communicating data with a second communication interface of the test computer, wherein the data includes the test requests and the test results,
wherein the test computer generates the second binary file from the first binary file,
wherein the test computer evaluates the test results using an evaluation program, which is executed by the test processor, in which the test results are compared to stored setpoint test results, and it is determined, depending on a deviation between the test results and the setpoint test results, whether the software is fit for operation,
wherein the control unit includes a switching test module for switching between a normal mode, a first test mode and a second test mode, wherein the test computer is configured to send switch commands to the control unit, and wherein the switch commands are encoded separately or in the test requests,
wherein the software of the control unit includes an intermediate layer or middleware for mediating between a system layer and an application layer, wherein the intermediate layer enables separate development of the system layer and the application layer, and the testing of individual software components, and wherein the switching test module is configured to interact between the system layer and the intermediate layer,
wherein the control unit includes a processor for executing the software or the test program with the switching test module integrated into the software, and the first communication interface for providing data communication with the test computer of the test system,
wherein the processor, the memory, and the first communication interface are connectable to one another via a bus system,
wherein the test computer includes a test computer memory, a test computer processor, a second communication interface for the data communication with control unit, and a test computer bus system, and
wherein the test program is permanently deactivated after testing, without having to change and re-compile a source code underlying the software.

11. A computer-implemented method for operating a test computer when testing software of a control unit of a test system, the control unit including a processor for executing the software and a memory for storing the software, the method comprising:
generating test requests by the test computer;
sending the test requests from the test computer to the control unit, the test requests prompting the processor of the control unit to execute a test program for testing the software by executing a first binary file stored in the memory, the first binary file encoding a test version of the software which includes at least one test module necessary for executing the test program, test results being generated;
receiving the test results, generated by the control unit, in the test computer, having a test processor for evaluating the test results;
determining by the test computer, based on the test results, whether the software is fit for operation;
generating a second binary file from the first binary file by the test computer when the test computer determines that the software is fit for operation, the second binary file encoding a final version of the software which prevents the at least one test module from being executed; and
sending the second binary file from the test computer to the control unit;
wherein the test program is configured to detect errors in the software,
wherein the test system includes a first communication interface for communicating data with a second communication interface of the test computer, wherein the data includes the test requests and the test results,
wherein the test computer generates the second binary file from the first binary file,
wherein the test computer evaluates the test results using an evaluation program, which is executed by the test processor, in which the test results are compared to stored setpoint test results, and it is determined, depending on a deviation between the test results and the setpoint test results, whether the software is fit for operation,
wherein the control unit includes a switching test module for switching between a normal mode, a first test mode and a second test mode, wherein the test computer is configured to send switch commands to the control unit, and wherein the switch commands are encoded separately or in the test requests, wherein the software of the control unit includes an intermediate layer or middleware for mediating between a system layer and an application layer, wherein the intermediate layer enables separate development of the system layer and the application layer, and the testing of individual software components, and wherein the switching test module is configured to interact between the system layer and the intermediate layer, wherein the control unit includes a processor for executing the software or the test program with the switching test module integrated into the software, and the first communication interface for providing data communication with the test computer of the test system, wherein the processor, the memory, and the first communication interface are connectable to one another via a bus system, wherein the test computer includes a test computer memory, a test computer processor, a second communication interface for the data communication with control unit, and a test computer bus system, and wherein the test program is permanently deactivated after testing, without having to change and re-compile a source code underlying the software.

12. A test apparatus to test software of a control unit of a test system, the control unit including a processor for executing the software and a memory for storing the software, comprising:
a test computer configured to perform a computer-implemented method, by performing the following:
generating test requests;
sending the test requests from the test computer to the control unit, the test requests prompting the processor of the control unit to execute a test program for testing the software by executing the software which is in the form of a first binary file stored in the memory, the first binary file encoding a test version of the software which includes at least one test module necessary for executing the test program, test results being generated;
receiving the test results, generated by the control unit, at a test computer, having a test processor for evaluating the test results;
determining, based on the test results, whether the software is fit for operation;
generating a second binary file from the first binary file when the test computer determines that the software is fit for operation, the second binary file encoding a final version of the software which prevents the at least one test module from being executed; and
sending the second binary file from the test computer to the control unit;
wherein the test program is configured to detect errors in the software,
wherein the test system includes a first communication interface for communicating data with a second communication interface of the test computer, wherein the data includes the test requests and the test results,
wherein the test computer generates the second binary file from the first binary file,
wherein the test computer evaluates the test results using an evaluation program, which is executed by the test processor, in which the test results are compared to stored setpoint test results, and it is determined, depending on a deviation between the test results and the setpoint test results, whether the software is fit for operation, wherein the control unit includes a switching test module for switching between a normal mode, a first test mode and a second test mode, wherein the test computer is configured to send switch commands to the control unit, and wherein the switch commands are encoded separately or in the test requests, wherein the software of the control unit includes an intermediate layer or middleware for mediating between a system layer and an application layer, wherein the intermediate layer enables separate development of the system layer and the application layer, and the testing of individual software components, and wherein the switching test module is configured to interact between the system layer and the intermediate layer, wherein the control unit includes a processor for executing the software or the test program with the switching test module integrated into the software, and the first communication interface for providing data communication with the test computer of the test system, wherein the processor, the memory, and the first communication interface are connectable to one another via a bus system, wherein the test computer includes a test computer memory, a test computer processor, a second communication interface for the data communication with control unit, and a test computer bus system, and wherein the test program is permanently deactivated after testing, without having to change and re-compile a source code underlying the software.

13. A test system for testing software of a control unit of a test system, comprising:
a control unit including:
a processor for executing software; and
a memory in which the software is stored;
wherein the control unit is configured to perform a computer-implemented method to test software of the control unit, by performing the following:
receiving, in the control unit, test requests generated by a test computer;
executing, by the processor, a test program for testing the software, based on the test requests, by executing the software which is in the form of a first binary file, which is stored in the memory, the first binary file encoding a test version of the software which includes at least one test module necessary for executing the test program, test results being generated;
sending the test results from the control unit to the test computer, having a test processor for evaluating the test results; and
receiving, in the control unit, a second binary file which is executable by the processor, in the control unit, and store the second binary file in the memory when the test computer has determined, based on the test results, that the software is fit for operation, the second binary file having been generated from the first binary file by the test computer and encodes a final version of the software which prevents the at least one test module from being executed; and
the test computer, which is configured to perform the following:
generating the test requests;
sending the test requests from the test computer to the control unit, the test requests prompting the processor to execute the test program for testing the software by executing the software which is in the form of first binary file stored in the memory;
receiving the test results generated by the control unit;
determining, based on the test results, whether the software is fit for operation;
generating the second binary file from the first binary file when the test computer determines that the software is fit for operation, the second binary file encoding the final version of the software which prevents the at least one test module from being executed; and
sending the second binary file from the test computer to the control unit;
wherein the test program is configured to detect errors in the software,
wherein the test system includes a first communication interface for communicating data with a second communication interface of the test computer, wherein the data includes the test requests and the test results,
wherein the test computer generates the second binary file from the first binary file,
wherein the test computer evaluates the test results using an evaluation program, which is executed by the test processor, in which the test results are compared to stored setpoint test results, and it is determined, depending on a deviation between the test results and the setpoint test results, whether the software is fit for operation,
wherein the control unit includes a switching test module for switching between a normal mode, a first test mode and a second test mode, wherein the test computer is configured to send switch commands to the control unit, and wherein the switch commands are encoded separately or in the test requests
wherein the software of the control unit includes an intermediate layer or middleware for mediating between a system layer and an application layer, wherein the intermediate layer enables separate development of the system layer and the application layer, and the testing of individual software components, and wherein the switching test module is configured to interact between the system layer and the intermediate layer,
wherein the control unit includes a processor for executing the software or the test program with the switching test module integrated into the software, and the first communication interface for providing data communication with the test computer of the test system, wherein the processor, the memory, and the first communication interface are connectable to one another via a bus system,
wherein the test computer includes a test computer memory, a test computer processor, a second communication interface for the data communication with control unit, and a test computer bus system, and
wherein the test program is permanently deactivated after testing, without having to change and re-compile a source code underlying the software.

14. A non-transitory computer-readable medium, on which is stored a computer program, which is executable by a processor, a control unit, of a test system, the control unit including the processor for executing software of the control unit and a memory for storing the software, comprising:
a program code arrangement having program code for operating the control unit when testing software of the control unit, to perform a computer-implemented method by performing the following:
receiving, in the control unit, test requests generated by a test computer;
executing, by the processor of the control unit, a test program for testing the software, based on the test requests, by executing the software which is in the form of a first binary file, which is stored in the memory, the first binary file encoding a test version of the software which includes at least one test module necessary for executing the test program, test results being generated;
sending the test results from the control unit to the test computer, having a test processor for evaluating the test results; and
receiving, in the control unit, a second binary file which is executable by the processor of the control unit, in the control unit, and storing the second binary file in the memory, when the test computer has determined, based on the test results, that the software is fit for operation, the second binary file having been generated from the first binary file by the test computer and encodes a final version of the software which prevents the at least one test module from being executed;
wherein the test program is configured to detect errors in the software,
wherein the test system includes a first communication interface for communicating data with a second communication interface of the test computer, wherein the data includes the test requests and the test results,
wherein the test computer generates the second binary file from the first binary file,
wherein the test computer evaluates the test results using an evaluation program, which is executed by the test processor, in which the test results are compared to stored setpoint test results, and it is determined, depending on a deviation between the test results and the setpoint test results, whether the software is fit for operation,
wherein the control unit includes a switching test module for switching between a normal mode, a first test mode and a second test mode, wherein the test computer is configured to send switch commands to the control unit, and wherein the switch commands are encoded separately or in the test requests,
wherein the software of the control unit includes an intermediate layer or middleware for mediating between a system layer and an application layer, wherein the intermediate layer enables separate development of the system layer and the application layer, and the testing of individual software components, and wherein the switching test module is configured to interact between the system layer and the intermediate layer,
wherein the control unit includes a processor for executing the software or the test program with the switching test module integrated into the software, and the first communication interface for providing data communication with the test computer of the test system, wherein the processor, the memory, and the first communication interface are connectable to one another via a bus system,
wherein the test computer includes a test computer memory, a test computer processor, a second communication interface for the data communication with control unit, and a test computer bus system, and wherein the test program is permanently deactivated after testing, without having to change and re-compile a source code underlying the software.

* * * * *